(12) United States Patent
Ishikawa

(10) Patent No.: US 10,928,919 B2
(45) Date of Patent: Feb. 23, 2021

(54) INFORMATION PROCESSING DEVICE AND INFORMATION PROCESSING METHOD FOR VIRTUAL OBJECTS OPERABILITY

(71) Applicant: SONY CORPORATION, Tokyo (JP)

(72) Inventor: Tsuyoshi Ishikawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 71 days.

(21) Appl. No.: 16/086,702

(22) PCT Filed: Feb. 9, 2017

(86) PCT No.: PCT/JP2017/004714
§ 371 (c)(1),
(2) Date: Sep. 20, 2018

(87) PCT Pub. No.: WO2017/169158
PCT Pub. Date: Oct. 5, 2017

(65) Prior Publication Data
US 2019/0121441 A1     Apr. 25, 2019

(30) Foreign Application Priority Data

Mar. 29, 2016     (JP) .............................. JP2016-066807

(51) Int. Cl.
*G06F 3/0481*     (2013.01)
*G06F 3/01*       (2006.01)
*G06F 3/0484*     (2013.01)

(52) U.S. Cl.
CPC ................ *G06F 3/017* (2013.01); *G06F 3/01* (2013.01); *G06F 3/011* (2013.01); *G06F 3/0481* (2013.01);
(Continued)

(58) Field of Classification Search
None
See application file for complete search history.

(56) References Cited

U.S. PATENT DOCUMENTS

2012/0050270 A1   3/2012   Noda et al.
2012/0056989 A1   3/2012   Izumi
(Continued)

FOREIGN PATENT DOCUMENTS

CA       2810307 A1     3/2012
CN     103124945 A      5/2013
(Continued)

OTHER PUBLICATIONS

International Search Report and Written Opinion of PCT Application No. PCT/JP2017/004714, dated May 9, 2017, 11 pages of ISRWO.
(Continued)

*Primary Examiner* — Amr A Awad
*Assistant Examiner* — Donna V Lui
(74) *Attorney, Agent, or Firm* — Chip Law Group

(57) ABSTRACT

Provided is an information processing device including: an operation determination unit configured to execute a determination process of determining an operation input of a user with an operating body with respect to a virtual object that is defined in a virtual three-dimensional space and is virtually perceivable by the user. The operation determination unit executes the determination process on a basis of spatial position information of the operating body in a real three-dimensional space and switches the determination process on a basis of information of the operating body.

18 Claims, 6 Drawing Sheets

(52) U.S. Cl.
CPC ...... *G06F 3/04815* (2013.01); *G06F 3/04842* (2013.01)

(56) References Cited

U.S. PATENT DOCUMENTS

| | | | |
|---|---|---|---|
| 2013/0249926 A1 | 9/2013 | Izumihara et al. | |
| 2013/0257692 A1 | 10/2013 | Yang et al. | |
| 2014/0201666 A1* | 7/2014 | Bedikian | G06F 3/04815 715/771 |
| 2014/0201684 A1* | 7/2014 | Holz | G06F 3/04817 715/848 |
| 2015/0007082 A1* | 1/2015 | Fischer | G06F 3/04815 715/771 |
| 2015/0309584 A1 | 10/2015 | Kawai et al. | |
| 2016/0012631 A1* | 1/2016 | Kim | G06T 19/006 345/419 |
| 2016/0246388 A1 | 8/2016 | Izumihara et al. | |
| 2018/0224928 A1* | 8/2018 | Ross | A61B 5/743 |
| 2018/0275749 A1* | 9/2018 | Yoon | G06Q 20/352 |

FOREIGN PATENT DOCUMENTS

| | | |
|---|---|---|
| CN | 103309443 A | 9/2013 |
| EP | 1909161 A1 | 4/2008 |
| EP | 2615523 A1 | 7/2013 |
| JP | 2006-126936 A | 5/2006 |
| JP | 2011-175617 A | 9/2011 |
| JP | 2013-196156 A | 9/2013 |
| JP | 2015-210684 A | 11/2015 |
| JP | 2016-035632 A | 3/2016 |
| KR | 10-2013-0049199 A | 5/2013 |
| KR | 10-2014-0140109 A | 12/2014 |
| WO | 2012/032687 A1 | 3/2012 |

OTHER PUBLICATIONS

Office Action for EP Patent Application No. 17773706.1, dated Sep. 8, 2020, 08 pages of Office Action.

* cited by examiner

INFORMATION PROCESSING DEVICE AND INFORMATION PROCESSING METHOD FOR VIRTUAL OBJECTS OPERABILITY

CROSS REFERENCE TO RELATED APPLICATIONS

This application is a U.S. National Phase of International Patent Application No. PCT/JP2017/004714 filed on Feb. 9, 2017, which claims priority benefit of Japanese Patent Application No. JP 2016-066807 filed in the Japan Patent Office on Mar. 29, 2016. Each of the above-referenced applications is hereby incorporated herein by reference in its entirety.

TECHNICAL FIELD

The present disclosure relates to an information processing device, an information processing method, and a program.

BACKGROUND ART

Devices worn on the heads of users for use like, for example, head-mounted displays (which may be referred to as "HMDs" below), eyewear-type wearable devices such as eyeglasses-type wearable devices (which may be referred to simply as "eyewear" below) have been developed.

Technologies related to HMDs have been developed under such circumstances. As a technology for performing an action corresponding to an operation with respect to a touch panel in a case in which an image generated by superimposing a virtual operation panel, which is displayed on the touch panel, on an image representing a real space is caused to be displayed on a display screen of an HMD, for example, the technology disclosed in Patent Literature 1 below is exemplified.

CITATION LIST

Patent Literature

Patent Literature 1: JP 2006-126936A

DISCLOSURE OF INVENTION

Technical Problem

By using an augmented reality (AR) technology, for example, it is possible to display a virtual object on a display screen of a device worn on the head of a user for use, such as an HMD or eyewear, such that an object of the real world and a virtual object defined in a virtual three-dimensional space (that is virtually perceivable by the user) can be visually recognized by the user at the same time. In addition, by projecting a virtual object in a real space using, for example, a spatial projection technology, it is possible to enable a user to visually recognize a real world object and a virtual object at the same time. Such a real world object may be referred to as a "real object" and a virtual object may be referred to as a "virtual object" below.

In a case in which such an AR technology or spatial projection technology described above is used, it is assumed that an operation is performed on a virtual object described above using, for example, a part of a user's body such as a hand or a finger, or an operating body of an operation device like a stylus, or the like.

However, in a case in which an operation is performed on a virtual object, there is no haptic feedback resulting from the operation, unlike in a case in which an operation is performed on a real object. For this reason, in such a case in which an operation is performed on a virtual object, for example, there is a possibility of a user performing the operation on the virtual object having difficulty finely designating an operation position. Thus, in the case in which the operation is performed on the virtual object, there is concern that the user will not be able to stably perform the operation on the virtual object.

The present disclosure proposes a novel and improved information processing device, information processing method, and program that can improve user operability.

Solution to Problem

According to the present disclosure, there is provided an information processing device including: an operation determination unit configured to execute a determination process of determining an operation input of a user with an operating body with respect to a virtual object that is defined in a virtual three-dimensional space and is virtually perceivable by the user. The operation determination unit executes the determination process on a basis of spatial position information of the operating body in a real three-dimensional space and switches the determination process on a basis of information of the operating body.

In addition, according to the present disclosure, there is provided an information processing method executed by an information processing device, the information processing method including: a step of executing a determination process of determining an operation input of a user with an operating body with respect to a virtual object defined in a virtual three-dimensional space. In the execution step, the determination process is executed on a basis of spatial position information of the operating body in a real three-dimensional space and the determination process is switched on a basis of information of the operating body.

In addition, according to the present disclosure, there is provided a program causing a computer system to realize: a function of executing a determination process of determining an operation input of a user with an operating body with respect to a virtual object defined in a virtual three-dimensional space. With the execution function, the determination process is executed on a basis of spatial position information of the operating body in a real three-dimensional space and the determination process is switched on a basis of information of the operating body.

Advantageous Effects of Invention

According to the present disclosure, user operability can be improved.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
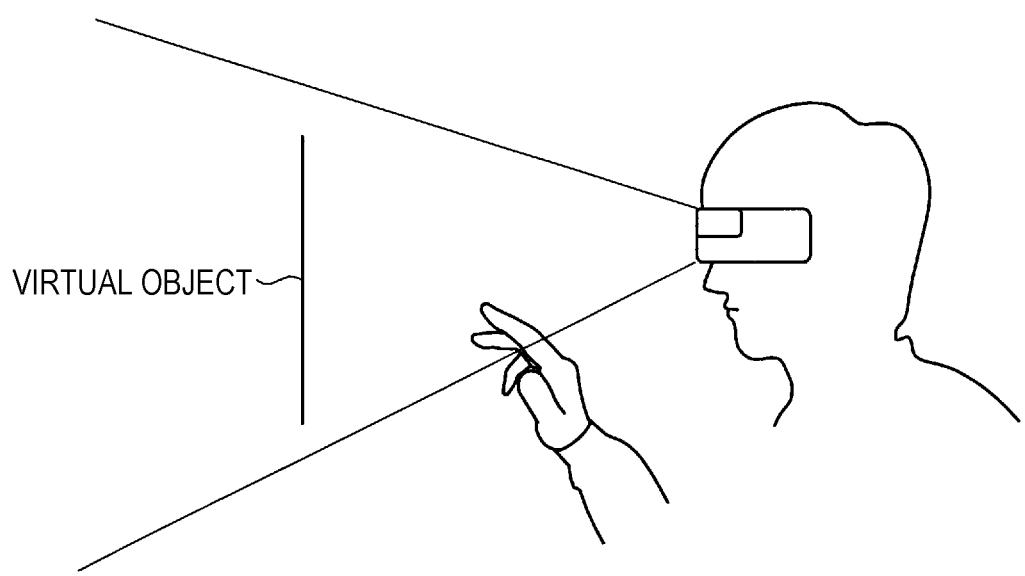
FIG. 1 is an explanatory diagram for describing an overview of an information processing method according to the present embodiment.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

In addition, description will be provided below in the following order.
1. Information processing method according to present embodiment
2. Information processing device according to present embodiment
3. Program according to present embodiment
(Information Processing Method According to Present Embodiment)

Figure 2:
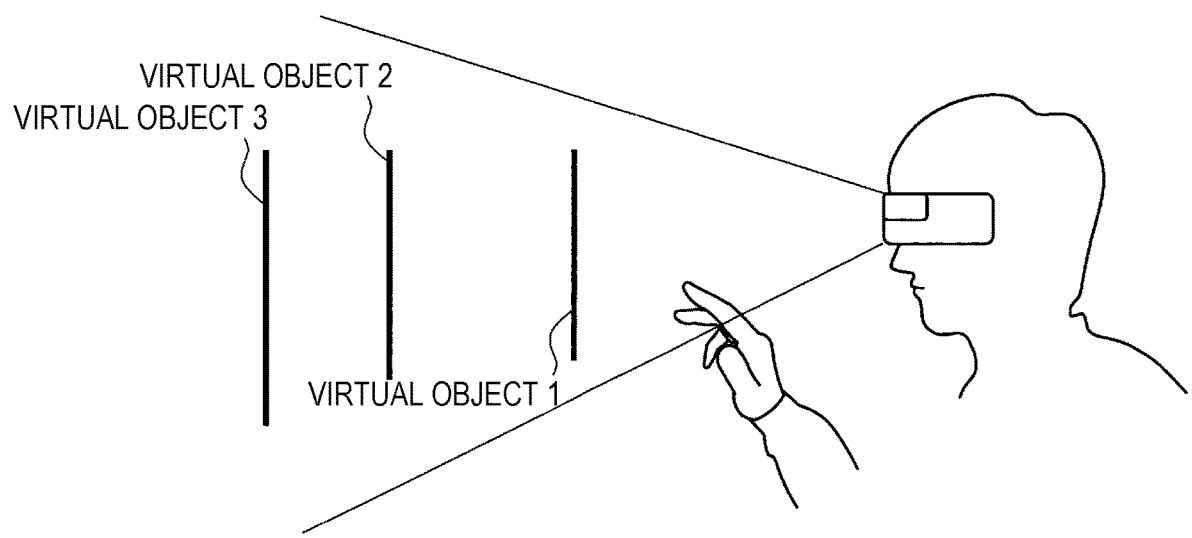
FIG. 2 is an explanatory diagram for describing an overview of an information processing method according to the present embodiment.

First, an information processing method according to the present embodiment will be described below. The information processing method according to the present embodiment will be described below exemplifying a case in which an information processing device according to the present embodiment performs a process related to the information processing method according to the present embodiment.
[1] Process Related to Information Processing Method According to Present Embodiment FIGS. 1 and 2 are explanatory diagrams for describing an overview of the information processing method according to the present embodiment. In FIGS. 1 and 2, an example in which a user is wearing an HMD with at least one imaging device that images an area in front of the user wearing the HMD is illustrated. Here, the information processing device according to the present embodiment may be the HMD illustrated in FIGS. 1 and 2, or may be an external device of the HMD illustrated in FIGS. 1 and 2. In the case in which the information processing device according to the present embodiment is an external device of the HMD illustrated in FIGS. 1 and 2, the information processing device according to the present embodiment and the HMD perform wired or wireless communication with each other. Note that application examples of the information processing device according to the present embodiment will be described below.

Position information indicating a position of a real object including depth information representing a distance between the user wearing the HMD and a captured real object (a subject), for example, is obtained from a captured image captured by the imaging device. The position information is expressed by, for example, three-dimensional coordinates of which the origin is an arbitrary position in a real space.

In addition, the HMD has a display device, and causes a virtual object to be superimposed at an arbitrary place in a front scene of the user and then to be displayed on a display screen of the display device. In FIGS. 1 and 2, a planar object such as a window is illustrated as a virtual object.

Here, the HMD illustrated in FIGS. 1 and 2 may be a transmissive-type device or may be a non-transmissive-type device. As a transmissive type, an arbitrary type such as a video transmissive type in which an outside view is electronically shown by displaying an image captured by an imaging device on a display screen, or an optically transmissive type is exemplified. In addition, as a display method for realizing the transmissive type, for example, an arbitrary display method in which the transmissive type can be realized, such as a hologram method, a half mirror method, or a pupil division method, is exemplified.

In a case in which the HMD illustrated in FIGS. 1 and 2 is a transmissive-type device, the virtual object is displayed at an arbitrary position on the display screen.

In addition, in the case in which the HMD illustrated in FIGS. 1 and 2 is a non-transmissive-type device, the captured image captured by the imaging device is displayed on the display screen and the virtual object is displayed to be superimposed at an arbitrary position of the captured image. In addition, since the position information of the real object is obtained from the captured image as described above, the virtual object may be displayed in consideration of the position information. As display of the virtual object in consideration of the position information, for example, "display in which a portion of the virtual object hidden by the real object is not drawn in a case in which the real object is located closer to the user than the position at which the virtual object is drawn" is exemplified.

In the example illustrated in FIG. 1, a case in which the user operates a virtual object using his or her hand (an example of an operating body; the same applies below) is conceivable. Here, as the operation performed on the virtual object illustrated in FIG. 1 using the hand, for example, a touch operation, a flick operation, a pinch operation, a drag operation, or the like is exemplified.

Here, it is necessary for the operation performed on the planar virtual object illustrated in FIG. 1 using the hand such as a touch operation or a flick operation to be performed along a plane. In addition, the operation can be said to be an operation that is difficult to perform precisely because the operation exhibits characteristics of, for example, a large amount of movement of the hand (or a fingertip), a high speed of movement of the hand (or the fingertip), and the like. In addition, because the operation is an operation performed on the virtual object in the air, which gives no haptic feedback on the operation, it is assumed that a position at which the operation is performed easily shifts in the depth direction as viewed from the user. Thus, the difficulty level of the operation illustrated in FIG. 1 is high.

In addition, in a case in which the hand (or the fingertip) shifts in the depth direction as viewed from the user during the operation performed on the planar virtual object illustrated in FIG. 1 using the hand, such as a touch operation or a flick operation, for example, there is concern that an action not intended by the user who has performed the operation will be performed, such as non-detection of the operation, or execution of a process related to another function assigned to be performed in the depth direction as viewed from the user.

In addition, in the example illustrated in FIG. 2, a case in which the user operates virtual objects using his or her hand as in FIG. 1 is conceivable. In FIG. 2, an example in which a plurality of virtual objects from a virtual object 1 to a virtual object 3, each of which is a planar virtual object, are displayed in the depth direction as viewed from the user is illustrated.

In a case in which the hand (or the fingertip) shifts in the depth direction as viewed from the user during the operation performed on the planar virtual object illustrated in FIG. 2 using the hand, such as a touch operation or a flick operation, for example, there is concern that an action not intended by the user who has performed the operation will be performed, such as non-detection of the operation, or execution of a process related to another virtual object assigned to be performed in the depth direction as viewed from the user.

As illustrated in FIGS. 1 and 2, in a case in which an operation is performed using an operating body such as a hand on a virtual object that does not give haptic feedback resulting from the operation, there is concern that the operation will cause an action not intended by the user. In addition, in the case in which the action not intended by the user is performed, user operability is highly likely to deteriorate, and thus it is hard to expect that user operability can be improved.

Thus, the information processing device according to the present embodiment switches, for example, a determination process of determining an operation input for a virtual object by a user using an operating body (a switching process).

A virtual object according to the present embodiment may be regarded as, for example, a virtual object that is defined in a virtual three-dimensional space and virtually perceivable by a user. Here, "virtually perceivable" may be interpreted that an object present in a real space is virtually recognizable. Note that a sensation that enables virtual perception is not limited to vision, and hearing, smell, taste, a somatosensory sensation, and the like may be included.

As virtual objects according to the present embodiment, for example, such planar virtual objects illustrated in FIGS. 1 and 2, like a window in which arbitrary content including a moving image, a still image, or the like is displayed, a window related to a graphical user interface (GUI), and the like are exemplified.

Note that virtual objects according to the present embodiment are not limited to planar virtual objects.

For example, a virtual object according to the present embodiment may be a three-dimensional virtual object such as a light bulb object, an animal object, or a curry rice object. As an operation performed on a virtual object according to the present embodiment using an operating body in a case in which the virtual object is such a three-dimensional virtual object, for example, movement of a hand (or a fingertip) along a surface (e.g., a curved surface, etc.) of a solid, movement of a hand (or a fingertip) passing through the inside and outside of the virtual object rather than along a surface of a solid, and the like are exemplified.

In addition, a virtual object according to the present embodiment, for example, may be a virtual input device described below. Note that it is a matter of course that examples of a virtual input device realized as a virtual object are not limited to the following examples.

Virtual keyboard
Virtual button
Virtual touch pad
Virtual mouse
Virtual lever
Virtual handle
Virtual slider In addition, a virtual object is displayed on a display screen, for example, to be visually recognized by a user simultaneously with a real object of the real world. That is, a virtual object is displayed, for example, to be visually recognizable with an image of an operating body in a real three-dimensional space. Displaying a virtual object and a real object on a display screen to be simultaneously visually recognizable by a user is realized by using, for example, an AR technology.

Note that a virtual object may be displayed on a display screen, for example, so as not to be visually recognized by a user simultaneously with a virtual object. For example, as an example in which a virtual object is displayed on a display screen so as not to be visually recognized by a user simultaneously with a real object, an example in which only a virtual object is displayed on a display screen of a non-transmissive-type HMD is exemplified.

In addition, in a case in which a virtual object is projected in a space using an arbitrary space projection technology, the virtual object is projected and thus a user can visually recognize the projected virtual object simultaneously with a real object.

As an operating body according to the present embodiment, for example, a part of a user's body such as his or her hand, finger, or foot, a line of sight (e.g., a focal position, etc.) of the user, an operation device such as a stylus, or the like is exemplified. A case in which an operating body according to the present embodiment is a part of a user's body such as his or her hand or finger will be mainly exemplified below.

The information processing device according to the present embodiment executes the determination process, for example, on the basis of an operation determination area defined in association with a virtual object.

Here, as an operation determination area according to the present embodiment, for example, an area defined in a virtual three-dimensional space having the same position and size as a virtual object defined in the virtual three-dimensional space is exemplified. In a case in which the operation determination area is the same area as the virtual object, a direct operation input by a user performed using an operating body with respect to the virtual object, for example, is determined in the determination process.

Note that an operation determination area according to the present embodiment is not limited to the example. For example, an operation determination area according to the present embodiment may be an area defined in a virtual three-dimensional space different from a virtual object defined in the virtual three-dimensional space.

As an operation determination area in a case in which the operation determination area is an area having a different size from a virtual object, for example, an area corresponding to a space around a user in which an operation with an operating body such as a hand of the user who is an operator or an operation device used by the user is performed is exemplified. In addition, in the case in which the operation determination areas are areas having different sizes from a virtual object, for example, such operation determination areas are set not to overlap or an arbitrary number of operation determination areas are set.

Here, the information processing device according to the present embodiment does not show an operation determination area. In this case, an operation determination area is not visually recognized by the user.

In addition, the information processing device according to the present embodiment may show the operation determination area to the user by, for example, displaying a line surrounding the operation determination area. In this case, the operation determination area or the like is displayed, for example, to be visually recognizable by the user.

The information processing device according to the present embodiment switches between, for example, the following first determination process and the following second determination process in the switching process according to the present embodiment.

First determination process: a determination process of determining an operation with respect to a virtual object without correcting a positional relationship between an operating body and the virtual object Second determination process: a determination process of determining an operation with respect to a virtual object with correction of a positional relationship between an operating body and the virtual object Here, a virtual object that is subject to the switching process according to the present embodiment is determined through, for example, a combination of a motion of an operating body and a distance between the operating body and the virtual object.

For example, when a predetermined motion of an operating body is detected, the information processing device according to the present embodiment sets a virtual object for which a distance from the operating body is smaller than a predetermined distance (or a virtual object for which the distance is equal to or smaller than the predetermined distance) as a virtual object that is subject to the switching process according to the present embodiment. A motion of the operating body is specified on the basis of, for example, information representing the motion of the operating body which will be described below. In addition, the distance between the operating body and the virtual object is specified from, for example, a position of the operating body estimated from a captured image and a position of the virtual object.

A predetermined motion of the operating body related to determination of a virtual object that is subject to the switching process according to the present embodiment is, for example, set in advance. In addition, the predetermined motion of the operating body according to the present embodiment may be changeable. As the predetermined motion of the operating body, for example, a motion of the operating body that changes from a speed (or acceleration) higher than a set threshold value to a speed (or acceleration) equal to or lower than the threshold value, or the like is exemplified.

In addition, the distance between the operating body and the virtual object related to the determination of the virtual object that is subject to the switching process according to the present embodiment is, for example, set in advance. In addition, the distance between the operating body and the virtual object according to the present embodiment may be changeable. A case in which a set distance between the operating body and the virtual object is greater than 0 (zero) corresponds to a case in which a detection range of the virtual object that is subject to the switching process according to the present embodiment is larger than an area occupied by the virtual object in a space.

Note that a specification method of each of a "motion of the operating body" and a "distance between the operating body and the virtual object" is not limited to the above, and the information processing device according to the present embodiment can use an arbitrary method that enables each of a "motion of the operating body" and a "distance between the operating body and the virtual object" to be specified.

More specifically, as the switching process, the information processing device according to the present embodiment performs, for example, one of (1) a switching process of a first example to (5) a switching process of a fifth example described below.

(1) First Example of Switching Process

The information processing device according to the present embodiment switches a determination process of determining an operation with respect to a virtual object on the basis of operating body information.

Here, as the operating body information according to the present embodiment, for example, either or both of information representing a motion of an operating body and information based on a position of the operating body are exemplified.

As the information representing a motion of the operating body, for example, data indicating a value related to the motion of the operating body such as a speed of the operating body or an acceleration of the operating body is exemplified. That is, the information representing a motion of the operating body includes, for example, information of a movement speed of the operating body. In addition, the information representing a motion of the operating body may include a plurality of different indicator values.

The information representing a motion of the operating body is obtained on the basis of, for example, a detection value of a sensor such as a speed sensor or an acceleration sensor. The sensor such as a speed sensor or an acceleration sensor performs sensing, for example, at predetermined cycles. To exemplify the cases illustrated in FIGS. 1 and 2, for example, in a case in which an HMD is the information processing device according to the present embodiment, a sensor of the information processing device according to the present embodiment or an external sensor connected to the information processing device according to the present embodiment is exemplified as the sensor. In addition, in a case in which an HMD is an external device of the information processing device according to the present embodiment, for example, a sensor of the HMD or an external sensor connected to the HMD is exemplified as the sensor.

The information processing device according to the present embodiment can change a criterion for determining that there is an operation with respect to a virtual object with, for example, a movement speed of an operating body. Here, the criterion is, for example, a criterion for a virtual positional relationship between the operating body and the virtual object.

To give an example, the information processing device according to the present embodiment switches the determination process such that, for example, the criterion for determining that there is an operation with respect to the virtual object is more relaxed when a movement speed of the operating body is a second speed that is higher than a first speed than when the movement speed of the operating body is the first speed. The information processing device according to the present embodiment relaxes the criterion such that, for example, it is easier to determine that there is an operation with respect to the virtual object when the movement speed of the operating body is the second speed than when the movement speed thereof is the first speed by changing a predetermined threshold value (which will be described below) for the switching of the determination process on the basis of the movement speed of the operating body.

Figure 3:
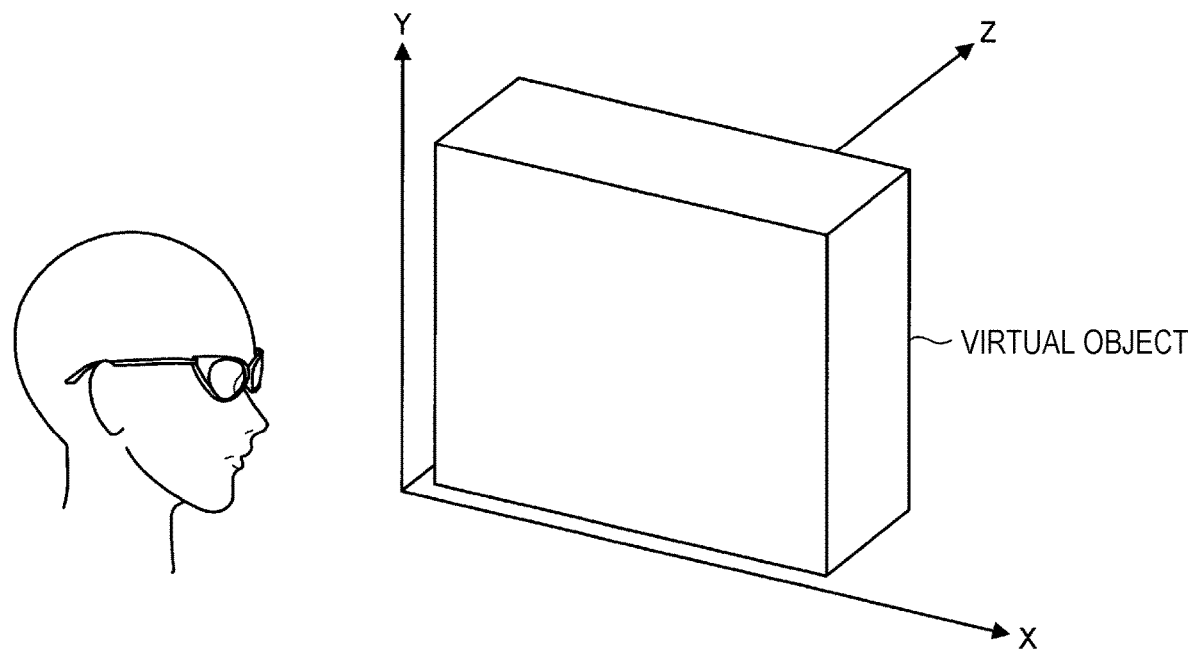
FIG. 3 is an explanatory diagram for describing an overview of an information processing method according to the present embodiment.

FIG. 3 is an illustrative diagram for describing an overview of the information processing method according to the present embodiment.

A position of an operating body in a real space in which operations can be performed with the operating body is represented by, for example, coordinates of a three-dimensional coordinate system of each virtual object having a position corresponding to the virtual object as the origin as illustrated in FIG. 3.

Note that a three-dimensional coordinate system according to the present embodiment is not limited to the three-dimensional coordinate system of each virtual object. A three-dimensional coordinate system according to the present embodiment may be represented by, for example, coordinates of a three-dimensional coordinate system having an arbitrary position in a real space as the origin.

In addition, in a case in which an arbitrary method that enables a speed or an acceleration of the operating body to be obtained without using coordinates of a three-dimensional coordinate system is used, no three-dimensional coordinate system may be set.

An example of an acquisition method of the information representing a motion of an operating body will be described below exemplifying a case in which a position of the operating body is expressed by coordinate values of an X axis, a Y axis, and a Z axis illustrated in FIG. 3.

A speed v of the operating body is calculated using, for example, the following Expression 1 on the basis of a change of a position of the operating body. Here, the following Expression 1 represents a calculation example of a speed of the operating body on the basis of changes of a position of the operating body at a time t1 ($X_{t1}$, $Y_{t1}$, $Z_{t1}$) and a position of the operating body at a time t2 (a time later than the time t1) ($X_{t2}$, $Y_{t2}$, $Z_{t2}$).

[Math. 1]

$$v = \frac{\sqrt{(X_{t2} - X_{t1})^2 + (Y_{t2} - Y_{t1})^2}}{t2 - t1}.$$ (Expression 1)

Note that a calculation method of a speed of the operating body is not limited to Expression 1 described above. For example, the information processing device according to the present embodiment can calculate a speed using an arbitrary method in which a speed of the operating body can be calculated, such as a method further using a Z axis component. In addition, a process of calculating a speed of the operating body may be performed by an external device of the information processing device according to the present embodiment.

In addition, the information processing device according to the present embodiment can calculate an acceleration of the operating body by differentiating a speed of the operating body. Note that the information processing device according to the present embodiment may calculate an acceleration of the operating body using an arbitrary method in which the acceleration of the operating body can be calculated. In addition, a process of calculating an acceleration of the operating body may be performed by an external device of the information processing device according to the present embodiment.

In addition, as information based on a position of the operating body, for example, data indicating a value in accordance with the position of the operating body (e.g., a position within an area in front of the user, a position within an area on a dominant hand side of the user, or a position within an area on a non-dominant hand side of the user) is exemplified. A value represented by the information based on the position of the operating body is obtained by using, for example, a position of the operating body estimated from a captured image and a table (or a database; the same applies hereinbelow) in which a position (or an area) is associated with a value represented by the information based on the position of the operating body.

A process of generating the information based on the position of the operating body may be performed by the information processing device according to the present embodiment or by an external device of the information processing device according to the present embodiment such as an HMD or a server. In a case in which the process of generating the information based on the position of the operating body is performed by an external device, the information processing device according to the present embodiment uses the information based on the position of the operating body acquired from the external device through communication.

More specifically, the information processing device according to the present embodiment switches between the first determination process and the second determination process on the basis of a result of comparison of an evaluation value based on operating body information with a predetermined threshold value.

Here, the evaluation value based on operating body information according to the present embodiment is obtained using, for example, the following Expression 2. "k" shown in the following Expression 2 is a set coefficient. "k" shown in the following Expression 2 may be a pre-set fixed value or a variable value that can change on the basis of an operation of a user, or the like. In addition, as a value represented by the operating body information, for example, an addition value, an average value, or the like of values included in the operating body information is exemplified.

Evaluation value based on operating body information=$k$×value represented by operating body information (Expression 2)

In addition, the predetermined threshold value of a first example may be a pre-set fixed value or a variable value that can change on the basis of an operation of the user, or the like.

In addition, the predetermined threshold value of the first example may be set on the basis of, for example, one or both of information with which a virtual object can be identified such as an ID of the virtual object or an ID of an application corresponding to the virtual object and information with which a user can be identified such as a user ID. The predetermined threshold value of the first example is set by, for example, adjusting a threshold reference value on the basis of one or both of a value corresponding to the information with which a virtual object can be identified and a value corresponding to the information with which a user can be identified. The value corresponding to the information with which a virtual object can be identified is obtained by using, for example, a table in which the information with which a virtual object can be identified is associated with the value. In addition, a value corresponding to the information with which a user can be identified is obtained by using, for example, a table in which the information with which a user can be identified is associated with the value.

By setting a threshold value on the basis of the information with which a virtual object can be identified, for example, the threshold value can be changed between a virtual object based on execution of an application for adults and a virtual object based on execution of an application for children. In addition, by setting the threshold value on the basis of the information with which a virtual object can be identified, for example, the threshold value can be changed between a case in which an application developed for touch-type touch panels is used and a case in which an application developed for non-touch-type touch panels such as touch panels that can detect proximity is used. In addition, by setting the threshold value on the basis of the information with which a virtual object can be identified, for example, the threshold value of each virtual object can be set, like setting a higher "threshold value of a virtual object corresponding to a process in which it is undesirable to cause an action not intended by the user to be performed, such as a virtual object related to execution of a billing process" or the like.

In addition, by setting a threshold value on the basis of information with which a user can be identified, for example, the threshold value can be changed between each user.

In addition, the predetermined threshold value of the first example may be set on the basis of, for example, a direction of an operation performed using the operating body. The predetermined threshold value of the first example is set by, for example, adjusting a threshold reference value on the basis of a value corresponding to the direction of the operation performed using the operating body.

The value corresponding to the direction of the operation performed using the operating body is obtained by using, for example, a table in which the direction is associated with the value.

Here, in the table in which the direction is associated with the value, for example, the value that is likely to decrease the threshold value in the direction in which accuracy is less likely to be obtained during an operation is associated with the direction. As an example of the direction in which accuracy is less likely to be obtained during an operation, for example, a direction in which visual recognition is difficult for the user such as the depth direction as viewed from the user is exemplified.

As described above, by using the "table in which the value that is likely to decrease the threshold value in the direction in which accuracy is less likely to be obtained during an operation is associated with the direction," for example, a positional relationship between the operating body and the virtual object is more easily corrected in the direction in which accuracy is less likely to be obtained during an operation. Thus, by using the table in which the value that is likely to decrease the threshold value in the direction in which accuracy is less likely to be obtained during an operation is associated with the direction, an operation of the operating body with respect to the virtual object in the direction in which accuracy is less likely to be obtained during an operation is assisted with, and therefore user operability can be improved. That is, a correction degree in the predetermined direction may be different from a correction degree in another direction.

Note that an acquisition method of a value corresponding to a direction of an operation by the operating body is not limited to the above.

For example, the information processing device according to the present embodiment can also obtain a value that is likely to decrease the threshold value in a case in which a direction of an operation by the operating body is a direction on a line connecting an eyeball of the user to his or her hand or finger (including an operation device such as a stylus) as a value corresponding to the direction of the operation by the operating body using an arbitrary algorithm.

In addition, the predetermined threshold value of the first example may be set on the basis of, for example, a value indicating a degree of denseness of virtual objects within a set area. The value indicating a degree of denseness of virtual objects within a set area is obtained from, for example, "one or both of the number of virtual objects within the area and a distance between the virtual objects within the area," and a "table in which one or both of the number of virtual objects and the distance between the virtual objects are associated with a value indicating the degree of denseness."

Here, in the table related to the value indicating a degree of denseness, for example, the value that is likely to increase the threshold is associated with one or both of the number of virtual objects and the distance between the virtual objects as the value indicating the degree of denseness of the virtual objects increases, i.e., as the plurality of virtual objects are denser within the set area.

As described above, by using the "table in which the value that is likely to increase the threshold value is associated with one or both of the number of virtual objects and the distance between the virtual objects as the value indicating the degree of denseness of the virtual objects increases," for example, it is more difficult to correct the positional relationship between the operating body and the virtual objects as the plurality of virtual objects are denser within the set area. Thus, by using the "table in which the value that is likely to increase the threshold value is associated with one or both of the number of virtual objects and the distance between the virtual objects as the value indicating the degree of denseness of the virtual objects increases," for example, it is possible to further lower the possibility of an operation being determined to have been performed on a virtual object and a process being performed despite the fact that the user is slowly moving the operating body such as his or her finger. That is, by using the "table in which the value that is likely to increase the threshold value is associated with one or both of the number of virtual objects and the distance between the virtual objects as the value indicating the degree of denseness of the virtual objects increases," it is possible to prevent an action not intended by the user who performed the operation from being performed. In other words, the information processing device (e.g., an operation determination unit which will be described below) may make the determination process more difficult to switch when a plurality of virtual objects have a second density that is higher than a first density than when the plurality of virtual objects have the first density. In addition, the information processing device (e.g., the operation determination unit which will be described below) may switch the determination process such that the criterion for determining that there is an operation with respect to a virtual object becomes stricter in a case in which a movement speed of the operating body is equal to or lower than a predetermined value.

The information processing device according to the present embodiment performs the first determination process in a case in which, for example, the evaluation value based on operating body information is smaller than a predetermined threshold value (or in a case in which the evaluation value is equal to or smaller than the threshold value; the same applies hereinbelow).

Here, the case in which the evaluation value based on operating body information is smaller than the predetermined threshold value corresponds to, for example, a case in which the possibility of an action not intended by the user who performed an operation being performed is low as illustrated with reference to FIGS. 1 and 2. Thus, in the case in which the evaluation value based on operating body information is smaller than the predetermined threshold value, the information processing device according to the present embodiment performs the first determination process of determining an operation with respect to a virtual object without correcting the positional relationship between the operating body and the virtual object.

In addition, the information processing device according to the present embodiment performs the second determination process in a case in which, for example, the evaluation value based on operating body information is larger than or equal to the predetermined threshold value (or in a case in which the evaluation value is larger than the threshold value; the same applies hereinbelow).

Here, the case in which the evaluation value based on operating body information is larger than or equal to the predetermined threshold value corresponds to, for example, a case in which the possibility of an action not intended by the user who performed an operation being performed is high as illustrated with reference to FIGS. 1 and 2. Thus, in the case in which the evaluation value based on operating body information is larger than or equal to the predetermined threshold value, the information processing device according to the present embodiment performs the second determination process of determining an operation with respect to a virtual object with correction of the positional relationship between the operating body and the virtual object. Note that the evaluation value based on operating body information is associated with information indicating a motion of the operating body (e.g., action data of the operating body such as a speed of the operating body or an acceleration of the operating body) and information based on a position of the operating body (e.g., a position, an area or the like with reference to the user) as described above.

In a case in which the second determination process is performed, the information processing device according to the present embodiment corrects the positional relationship between the operating body and the virtual object by, for example, setting a positional deviation between the operating body and the virtual object to "0" (zero). In addition, correction of the positional deviation between the operating body and the virtual object may be, for example, correction of the positional deviation in a specific direction, like in a depth direction as viewed from the user or the like.

Note that a correction method of the positional relationship between the operating body and the virtual object in the switching process of the first example is not limited to the above.

For example, the information processing device according to the present embodiment can also correct the positional relationship between the operating body and the virtual object by reducing the positional deviation between the operating body and the virtual object in accordance with an evaluation value based on operating body information shown in Expression 2 described above.

To give a specific example, in a case in which correction is performed such that the positional deviation between the operating body and the virtual object is reduced in accordance with an evaluation value based on operating body information shown in Expression 2 described above, the information processing device according to the present embodiment specifies a correction value for the positional deviation corresponding to the evaluation value based on operating body information with reference to, for example, a table in which the evaluation value is associated with the correction value. In addition, the information processing device according to the present embodiment may specify the correction value corresponding to the evaluation value based the operating body information by using, for example, a function having the evaluation value based on operating body information as a variable.

Then, the information processing device according to the present embodiment corrects the positional relationship between the operating body and the virtual object with the specified correction value such that the positional deviation between the operating body and the virtual object is reduced.

As described above, in the case in which the switching process of the first example is performed, the information processing device according to the present embodiment switches between the first determination process and the second determination process on the basis of a comparison result of the evaluation value based on operating body information and the predetermined threshold value. Thus, in the case in which the switching process of the first example is performed, the positional relationship between the operating body and the virtual object is selectively corrected on the basis of the operating body information, and thus it is possible to lower the possibility of an action not intended by the user who performed the operation being performed as illustrated with reference to, for example, FIGS. 1 and 2.

Therefore, by performing the switching process of the first example, the information processing device according to the present embodiment can achieve improvement in user operability.

(2) Second Example of Switching Process

The information processing device according to the present embodiment switches the determination process of determining an operation with respect to a virtual object on the basis of operating body information and virtual object information.

Here, as the virtual object information according to the present embodiment, for example, at least one of information representing a position of the virtual object, information representing a state of the virtual object, and information representing a type of the virtual object is exemplified.

As the information representing a position of the virtual object, for example, data indicating a value in accordance with the position of the virtual object (e.g., a position within a front area of the user, a position within an area on a dominant hand side of the user, or a position within an area on a non-dominant hand side of the user) is exemplified. A value indicating information based on a position of the virtual object is obtained by using, for example, a position of the virtual object estimated from a captured image and a table in which a position (or an area) is associated with the value represented by the information based on the position of the virtual object.

In addition, the value represented by the information based on the position of the virtual object may be set on the basis of, for example, a direction in which the virtual object is positioned with respect to the user (or an angle thereof with respect to the user). In a case in which the value represented by the information based on the position of the virtual object is set on the basis of a direction in which the virtual object is positioned, for example, the value represented by the information based on the position of the virtual object is set to further increase as an oblique direction component of the position of the virtual object with respect to the user increases.

A process of generating the information based on the position of the virtual object may be performed by the information processing device according to the present embodiment or by an external device of the information processing device according to the present embodiment such as an HMD or a server. In a case in which the process of generating the information based on the position of the virtual object is performed by an external device, the information processing device according to the present embodiment uses the information based on the position of the virtual object acquired from the external device through communication.

In addition, as the information representing a state of the virtual object, for example, data indicating a value in accordance with at least one of transparency set for the virtual object, a value of a size such as an expansion ratio or a reduction ratio set for the virtual object, and a value indicating a degree of denseness of virtual objects within a set area is exemplified. A value represented by the information representing a state of the virtual object is obtained by using, for example, a "table in which at least one of transparency, a value related to a size, and a value indicating a degree of denseness of virtual objects is associated with the value represented by the information representing the state of the virtual object."

A process of generating the information representing a state of the virtual object may be performed by the information processing device according to the present embodiment or by an external device of the information processing device according to the present embodiment such as an HMD or a server. In a case in which the process of generating the information representing a state of the virtual object is performed by an external device, the information processing device according to the present embodiment uses the information representing a state of the virtual object acquired from the external device through communication.

In addition, as the information representing a type of the virtual object, for example, data indicating a value in accordance with an ID of the virtual object, an ID of an application corresponding to the virtual object, or the like is exemplified. A value represented by the information representing a type of the virtual object is obtained by using, for example, a table in which an ID is associated with a value represented by the information representing the type of the virtual object. By using the information representing the type of the virtual object, for example, values can be changed depending on an application corresponding to the virtual object or the virtual object, like by "causing a value represented by information representing a type of a virtual object for virtual objects corresponding to applications for adults to differ from a value represented by information representing a type of a virtual object for virtual objects corresponding to applications for children," or the like. In addition, by using the information representing the type of the virtual object, for example, values can be changed depending on virtual objects by "setting a value of a virtual object corresponding to a process in which it is undesirable to cause an action not intended by the user to be performed, such as a virtual object related to execution of a billing process, to be larger than a reference value," or the like.

A process of generating the information representing a type of the virtual object may be performed by the information processing device according to the present embodiment or by an external device of the information processing device according to the present embodiment such as an HMD or a server. In a case in which the process of generating the information representing a type of the virtual object is performed by an external device, the information processing device according to the present embodiment uses the information representing a type of the virtual object acquired from the external device through communication.

More specifically, the information processing device according to the present embodiment switches between the first determination process and the second determination process on the basis of a result of comparison of an evaluation value based on operating body information and virtual object information with a predetermined threshold value.

Here, the evaluation value based on operating body information and the virtual object information according to the present embodiment is obtained from, for example, the following Expression 3. "k" and "j" shown in the following Expression 3 each are set coefficients. The "k" and "j" shown in the following Expression 3 each may be pre-set fixed values or variable values that can be changed on the basis of a user operation or the like. In addition, as a value represented by the operating body information, for example, an addition value, an average value, or the like of values included in the operating body information is exemplified. In addition, as a value represented by the virtual object information, for example, an addition value, an average value, or the like of values included in the virtual object information is exemplified.

Evaluation value based on operating body information and virtual object information=$k\times$(value represented by operating body information)+$j\times$(value represented by virtual object information)  (Expression 3)

In addition, the predetermined threshold value of a second example may be a pre-set fixed value or a variable value that can change on the basis of an operation of the user, or the like.

In addition, the predetermined threshold value of the second example may be set on the basis of, for example, one or both of information with which the virtual object can be identified and information with which the user can be identified, similarly to the threshold value of the first example. By setting the threshold value on the basis of the information with which the virtual object can be identified, for example, "changing the threshold value between a virtual object based on execution of an application for adults and a virtual object based on execution of an application for children," "setting a threshold value of a virtual object, such as a virtual object related to execution of a billing process, corresponding to a process in which it is undesirable to cause an action not intended by the user to be performed, to be higher," or the like is realized.

In addition, by setting a threshold value on the basis of information with which a user can be identified, for example, the threshold value can be changed between each user.

In addition, the predetermined threshold value of the second example can be set, for example, on the basis of a direction of an operation by the operating body or a value indicating a degree of denseness of virtual objects within a set area, similarly to the predetermined threshold value of the first example.

The information processing device according to the present embodiment performs the first determination process in a case in which, for example, the evaluation value based on operating body information and virtual object information is smaller than a predetermined threshold value (or in a case in which the evaluation value is equal to or smaller than the threshold value; the same applies hereinbelow).

Here, the case in which the evaluation value based on operating body information and virtual object information is smaller than the predetermined threshold value corresponds to, for example, a case in which the possibility of an action not intended by the user who performed an operation being performed is low as illustrated with reference to FIGS. 1 and 2. Thus, in the case in which the evaluation value based on operating body information and virtual object information is smaller than the predetermined threshold value, the information processing device according to the present embodiment performs the first determination process of determining an operation with respect to a virtual object without correcting the positional relationship between the operating body and the virtual object.

In addition, the information processing device according to the present embodiment performs the second determination process in a case in which, for example, the evaluation value based on operating body information and virtual object information is larger than or equal to the predetermined threshold value (or in a case in which the evaluation value is larger than the threshold value; the same applies hereinbelow).

Here, the case in which the evaluation value based on the operating body information and the virtual object information is larger than or equal to the predetermined threshold value corresponds to, for example, a case in which a possibility of an action not intended by the user who performed an operation being performed is high as illustrated with reference to FIGS. 1 and 2. Thus, in the case in which the evaluation value based on the operating body information and the virtual object information is larger than or equal to the predetermined threshold value, the information processing device according to the present embodiment performs the second determination process of determining an operation with respect to the virtual object with correction of the positional relationship between the operating body and the virtual object.

In the case in which the second determination process is performed, the information processing device according to the present embodiment corrects the positional relationship between the operating body and the virtual object by, for example, setting a positional deviation between the operating body and the virtual object to "0" (zero).

Note that a correction method of the positional relationship between the operating body and the virtual object in the switching process of the second example is not limited to the above.

For example, the information processing device according to the present embodiment can correct the positional relationship between the operating body and the virtual object by, for example, reducing the positional deviation between the operating body and the virtual object in accordance with the evaluation value based on the operating body information and the virtual object information shown in the above-described Expression 3, as in the switching process of the first example.

As described above, in the case in which the switching process of the second example is performed, the information processing device according to the present embodiment switches between the first determination process and the second determination process on the basis of a comparison result of the evaluation value based on operating body information and virtual object information and the predetermined threshold value. Thus, in the case in which the switching process of the second example is performed, the positional relationship between the operating body and the virtual object is selectively corrected on the basis of the operating body information and the virtual object information, and thus it is possible to lower the possibility of an action not intended by the user who performed the operation being performed as illustrated with reference to, for example, FIGS. 1 and 2.

Therefore, by performing the switching process of the second example, the information processing device according to the present embodiment can achieve improvement in user operability.

(3) Third Example of Switching Process

The information processing device according to the present embodiment switches between the determination processes of determining an operation with respect to a virtual object on the basis of operating body information and user state information.

Here, as the user state information according to the present embodiment, for example, data indicating a value corresponding to a recognition result of a user state in which a user is stationary, walking, running, climbing stairs, or the like is exemplified.

A value represented by the user state information is obtained by using, for example, a table in which a recognition result of a user state is associated with the user state and the value represented by the user state information.

A user state can be recognized by using an arbitrary technology in which a user state can be estimated like, for example, state estimation that uses a detection value of a sensor that can detect motions such as an acceleration sensor or a gyro sensor, state estimation that uses a behavior history, or the like using position information obtained by a positioning device such as a Global Positioning System (GPS) device, or the like.

A process of generating the user state information may be performed by the information processing device according to the present embodiment or by an external device of the information processing device according to the present embodiment such as an HMD or a server. In a case in which the process of generating the user state information is performed by an external device, the information processing device according to the present embodiment uses the user state information acquired from the external device through communication.

More specifically, the information processing device according to the present embodiment switches between the first determination process and the second determination process on the basis of a result of comparison of an evaluation value based on operating body information and user state information with a predetermined threshold value.

Here, the evaluation value based on operating body information and the user state information according to the present embodiment is obtained from, for example, the following Expression 4. "k" and "l" shown in the following Expression 4 each are set coefficients. The "k" and "l" shown in the following Expression 4 each may be pre-set fixed values or variable values that can be changed on the basis of a user operation or the like. In addition, as a value represented by the operating body information, for example, an addition value, an average value, or the like of values included in the operating body information is exemplified.

Evaluation value based on operating body information and user state information=$k \times$(value represented by operating body information)+$l \times$(value represented by user state information)   (Expression 4)

In addition, the predetermined threshold value of a third example may be a pre-set fixed value or a variable value that can change on the basis of an operation of the user, or the like.

In addition, the predetermined threshold value of the third example may be set on the basis of, for example, one or both of information with which the virtual object can be identified and information with which the user can be identified, similarly to the threshold value of the first example. By setting the threshold value on the basis of the information with which the virtual object can be identified, for example, "changing the threshold value between a virtual object based on execution of an application for adults and a virtual object based on execution of an application for children," "setting a threshold value of a virtual object, such as a virtual object related to execution of a billing process, corresponding to a process in which it is undesirable to cause an action not intended by the user to be performed, to be higher," or the like is realized.

In addition, by setting a threshold value on the basis of information with which a user can be identified, for example, the threshold value can be changed between each user.

In addition, the predetermined threshold value of the third example can be set, for example, on the basis of a direction of an operation by the operating body or a value indicating a degree of denseness of virtual objects within a set area, similarly to the predetermined threshold value of the first example.

The information processing device according to the present embodiment performs the first determination process in a case in which, for example, the evaluation value based on operating body information and user state information is smaller than a predetermined threshold value (or in a case in which the evaluation value is equal to or smaller than the threshold value; the same applies hereinbelow).

Here, the case in which the evaluation value based on operating body information and user state information is smaller than the predetermined threshold value corresponds to, for example, a case in which the possibility of an action not intended by the user who performed an operation being performed is low as illustrated with reference to FIGS. 1 and 2. Thus, in the case in which the evaluation value based on operating body information and user state information is smaller than the predetermined threshold value, the information processing device according to the present embodiment performs the first determination process of determining an operation with respect to a virtual object without correcting the positional relationship between the operating body and the virtual object.

In addition, the information processing device according to the present embodiment performs the second determination process in a case in which, for example, the evaluation value based on operating body information and user state information is larger than or equal to the predetermined threshold value (or in a case in which the evaluation value is larger than the threshold value; the same applies hereinbelow).

Here, the case in which the evaluation value based on the operating body information and the user state information is larger than or equal to the predetermined threshold value corresponds to, for example, a case in which a possibility of an action not intended by the user who performed an operation being performed is high as illustrated with reference to FIGS. 1 and 2. Thus, in the case in which the evaluation value based on the operating body information and the user state information is larger than or equal to the predetermined threshold value, the information processing device according to the present embodiment performs the second determination process of determining an operation with respect to the virtual object with correction of the positional relationship between the operating body and the virtual object.

In the case in which the third determination process is performed, the information processing device according to the present embodiment corrects the positional relationship between the operating body and the virtual object by, for example, setting a positional deviation between the operating body and the virtual object to "0" (zero).

Note that a correction method of the positional relationship between the operating body and the virtual object in the switching process of the third example is not limited to the above.

For example, the information processing device according to the present embodiment can correct the positional relationship between the operating body and the virtual object by, for example, reducing the positional deviation between the operating body and the virtual object in accordance with the evaluation value based on the operating body information and the user state information shown in the above-described Expression 4, as in the switching process of the first example.

As described above, in the case in which the switching process of the third example is performed, the information processing device according to the present embodiment switches between the first determination process and the second determination process on the basis of a comparison result of the evaluation value based on operating body information and user state information and the predetermined threshold value. Thus, in the case in which the switching process of the third example is performed, the positional relationship between the operating body and the virtual object is selectively corrected on the basis of the operating body information and the user state information, and thus it is possible to lower the possibility of an action not intended by the user who performed the operation being performed as illustrated with reference to, for example, FIGS. 1 and 2.

Therefore, by performing the switching process of the third example, the information processing device according to the present embodiment can achieve improvement in user operability.

(4) Fourth Example of Switching Process

The information processing device according to the present embodiment switches the determination process of determining an operation with respect to a virtual object on the basis of operating body information, virtual object information, and user state information.

More specifically, the information processing device according to the present embodiment switches between the first determination process and the second determination process on the basis of a result of comparison of an evaluation value based on operating body information, virtual object information, and user state information with a predetermined threshold value.

Here, the evaluation value based on the operating body information, the virtual object information, and the user state information according to the present embodiment is obtained from, for example, the following Expression 5. "k", "j", and "l" shown in the following Expression 5 each are set coefficients. The "k", "j", and "l" shown in the following Expression 5 each may be pre-set fixed values or variable values that can be changed on the basis of a user operation or the like. In addition, as a value represented by the operating body information, for example, an addition value, an average value, or the like of values included in the operating body information is exemplified. In addition, as a value represented by the virtual object information, for example, an addition value, an average value, or the like of values included in the virtual object information is exemplified.

Evaluation value based on operating body information, virtual object information, and user state information=$k$×(value represented by operating body information)+$j$×(value represented by virtual object information)+$l$×(value represented by user state information)　(Expression 5)

In addition, the predetermined threshold value of a fourth example may be a pre-set fixed value or a variable value that can change on the basis of an operation of the user, or the like.

In addition, the predetermined threshold value of the fourth example may be set on the basis of, for example, one or both of information with which the virtual object can be identified and information with which the user can be identified, similarly to the threshold value of the first example. By setting the threshold value on the basis of the information with which the virtual object can be identified, for example, "changing the threshold value between a virtual object based on execution of an application for adults and a virtual object based on execution of an application for children," "setting a threshold value of a virtual object, such as a virtual object related to execution of a billing process, corresponding to a process in which it is undesirable to cause an action not intended by the user to be performed, to be higher," or the like is realized.

In addition, by setting a threshold value on the basis of information with which a user can be identified, for example, the threshold value can be changed between each user.

In addition, the predetermined threshold value of the fourth example can be set, for example, on the basis of a direction of an operation by the operating body or a value indicating a degree of denseness of virtual objects within a set area, similarly to the predetermined threshold value of the first example.

The information processing device according to the present embodiment performs the first determination process in a case in which, for example, the evaluation value based on operating body information, virtual object information, and user state information is smaller than a predetermined threshold value (or in a case in which the evaluation value is equal to or smaller than the threshold value; the same applies hereinbelow).

Here, the case in which the evaluation value based on operating body information, virtual object information, and user state information is smaller than the predetermined threshold value corresponds to, for example, a case in which the possibility of an action not intended by the user who performed an operation being performed is low as illustrated with reference to FIGS. 1 and 2. Thus, in the case in which the evaluation value based on operating body information, virtual object information, and user state information is smaller than the predetermined threshold value, the information processing device according to the present embodiment performs the first determination process of determining an operation with respect to a virtual object without correcting the positional relationship between the operating body and the virtual object.

In addition, the information processing device according to the present embodiment performs the second determination process in a case in which, for example, the evaluation value based on operating body information, virtual object information, and user state information is larger than or equal to the predetermined threshold value (or in a case in which the evaluation value is larger than the threshold value; the same applies hereinbelow).

Here, the case in which the evaluation value based on operating body information, the virtual object information, and the user state information is larger than or equal to the predetermined threshold value corresponds to, for example, a case in which a possibility of an action not intended by the user who performed an operation being performed is high as illustrated with reference to FIGS. 1 and 2. Thus, in the case in which the evaluation value based on the operating body information, the virtual object information, and the user state information is larger than or equal to the predetermined threshold value, the information processing device according to the present embodiment performs the second determination process of determining an operation with respect to the virtual object with correction of the positional relationship between the operating body and the virtual object.

In the case in which the fourth determination process is performed, the information processing device according to the present embodiment corrects the positional relationship between the operating body and the virtual object by, for example, setting a positional deviation between the operating body and the virtual object to "0" (zero).

Note that a correction method of the positional relationship between the operating body and the virtual object in the switching process of the fourth example is not limited to the above.

For example, the information processing device according to the present embodiment can correct the positional relationship between the operating body and the virtual object by, for example, reducing the positional deviation between the operating body and the virtual object in accordance with the evaluation value based on the operating body information, the virtual object information, and the user state information shown in the above-described Expression 5, as in the switching process of the first example.

As described above, in the case in which the switching process of the fourth example is performed, the information processing device according to the present embodiment switches between the first determination process and the second determination process on the basis of a comparison result of the evaluation value based on operating body information, virtual object information, and user state information and the predetermined threshold value. Thus, in the case in which the switching process of the fourth example is performed, the positional relationship between the operating body and the virtual object is selectively corrected on the basis of the operating body information, the virtual object information, and the user state information, and thus it is possible to lower the possibility of an action not intended by the user who performed the operation being performed as illustrated with reference to, for example, FIGS. 1 and 2.

Therefore, by performing the switching process of the fourth example, the information processing device according to the present embodiment can achieve improvement in user operability.

(5) Fifth Example of Switching Process

The information processing device according to the present embodiment switches between the first determination process and the second determination process on the basis of "operating body information" and "one or both of virtual object information and user state information" as introduced in the switching process of the first example described in (1) to the switching process of the fourth example described in (4) above.

Note that a switching process according to the present embodiment is not limited to the switching process of the first example described in (1) to the switching process of the fourth example described in (4) above.

For example, the information processing device according to the present embodiment may switch between the first determination process and the second determination process on the basis of "one or both of the virtual object information and the user state information" without using the operating body information.

Even in a case in which the operating body information is not used, the information processing device according to the present embodiment can switch between the first determination process and the second determination process on the basis of a comparison result of an evaluation value based on one or both of the virtual object information and the user state information and a predetermined threshold value. Here, the evaluation value based on one or both of the virtual object information and the user state information is obtained by, for example, setting a coefficient of an index that is not used in Expression 5 described above to "0" (zero).

Therefore, even in the case in which the first determination process and the second determination process are switched on the basis of one or both of the virtual object information and the user state information, the information processing device according to the present embodiment can achieve improvement in user operability.

The information processing device according to the present embodiment performs, for example, the above-described switching process (e.g., any process among the switching process of the first example described in (1) to the switching process of the fifth example described in (5) above) as a process related to the information processing method according to the present embodiment.

By performing the switching process according to the present embodiment, the positional relationship between the operating body and the virtual object can be selectively corrected, and thus the possibility of an action not intended by the user who performed an operation being performed, for example, as illustrated with reference to FIGS. 1 and 2, can be lowered.

Therefore, by performing the switching process as the process related to the information processing method according to the present embodiment, the information processing device according to the present embodiment can achieve improvement in user operability.

Note that a process related to the information processing method according to the present embodiment is not limited to the switching process. For example, the information processing device according to the present embodiment can further perform at least one of (I) a notification control process, (II) an execution control process, and (III) a display control process that will be introduced below.

(I) Notification Control Process

The information processing device according to the present embodiment notifies a user of a virtual object that is subject to the switching process according to the present embodiment.

The information processing device according to the present embodiment visually notifies a user of a virtual object that is subject to the switching process by, for example, controlling display of the virtual object and making the virtual object that is subject to the switching process according to the present embodiment conspicuous with the following display methods. Note that it is a matter of course that a display method for making a virtual object that is subject to the switching process according to the present embodiment conspicuous is not limited to the following examples.

- Highlighting a virtual object that is subject to the switching process according to the present embodiment.
- Displaying virtual objects other than a virtual object that is subject to the switching process according to the present embodiment to be grayed out.
- Combination of the above operations Note that an example in which a user is visually notified of a virtual object that is subject to the switching process according to the present embodiment is not limited to the examples described above. For example, the information processing device according to the present embodiment can also notify a user that the positional relationship between the operating body and the virtual object has been corrected or a degree of correction of the positional relationship between the operating body and the virtual object by changing a degree of highlight display of the virtual object, color or brightness given to the virtual object, or the like.

In addition, the information processing device according to the present embodiment can also notify a user of a virtual object that is subject to the switching process according to the present embodiment through, for example, auditory notification realized by outputting a signal of a voice indicating that the virtual object has been determined (also including a sound and music; the same applies hereinbelow) to a voice output device such as a speaker or tactile notification realized by vibrating a vibration device. In addition, the information processing device according to the present embodiment may notify a user, for example, that the positional relationship between the operating body and the virtual object has been corrected or a degree of the correction of the positional relationship between the operating body and the virtual object through auditory notification using a voice or tactile notification using vibration.

In addition, the information processing device according to the present embodiment may notify a user of a virtual object that is subject to the switching process according to the present embodiment, the correction of the positional relationship between the operating body and the virtual object, and a degree of the correction of the positional relationship between the operating body and the virtual object by, for example, combining two or more of visual notification, tactile notification, and tactile notification.

By performing such a notification control process as the process related to the information processing method according to the present embodiment, a virtual object that is subject to the switching process can be more easily recognized by a user. Thus, the user can recognize the virtual object operated using the operating body since the notification control process is performed, and therefore user operability can be further improved.

Note that the notification control process according to the present embodiment may be performed by an external device of the information processing device according to the present embodiment.

(II) Execution Control Process

The information processing device according to the present embodiment controls, for example, execution of a process corresponding to an operation with respect to a virtual object determined in the determination process related to the switching process according to the present embodiment. As the process corresponding to an operation with respect to a virtual object, for example, an arbitrary process associated with the virtual object such as execution of an application selected through an operation or a billing process is exemplified.

The information processing device according to the present embodiment causes, for example, a control object to perform the process corresponding to a determined operation with respect to a virtual object.

As the control object according to the present embodiment, for example, one or both of the information processing device according to the present embodiment and an external device of the information processing device according to the present embodiment are exemplified. As an external device that is a control object according to the present embodiment, for example, an arbitrary device such as an HMD or a server is exemplified.

In a case in which the control object according to the present embodiment is the information processing device according to the present embodiment, the information processing device according to the present embodiment performs the process corresponding to a determined operation with respect to a virtual object using, for example, a processor or the like of the information processing device according to the present embodiment.

In addition, in a case in which the control object according to the present embodiment is the external device, the information processing device according to the present embodiment causes the external device to perform the process corresponding to the determined operation with respect to the virtual object by, for example, transmitting a process execution request including a process command for causing the process corresponding to the determined operation with respect to the virtual object to be performed to the external device. The information processing device according to the present embodiment causes, for example, a communication unit (which will be described below) of the information processing device according to the present embodiment or an external communication device connected to the information processing device according to the present embodiment to transmit the process execution request.

Note that the execution control process according to the present embodiment may be performed by an external device of the information processing device according to the present embodiment.

(III) Display Control Process

The information processing device according to the present embodiment may change display of a virtual object on the basis of the determination that there was an operation in the executed determination process (the determination process switched in the switching process according to the present embodiment).

The information processing device according to the present embodiment may change display of a virtual object by transmitting, for example, a control signal including a display command to a display device on which the virtual object is displayed, and the control signal may include display data related to the display of the virtual object.

By changing display of the virtual object described above, the information processing device according to the present embodiment can enable the user to recognize, for example, the virtual object determined that there was an operation through the determination process. Note that the display control process according to the present embodiment may be performed as a part of the process (I) (the notification control process).

The information processing device according to the present embodiment performs, for example, "the switching process" or "the switching process and at least one of the process (I) (the notification control process), the process (II) (the execution control process), and the process (III) (the display control process) described above" as the process related to the information processing method according to the present embodiment.

Note that each of "the switching process" and "the switching process and at least one of the process (I) (the notification control process), the process (II) (the execution control process), and the process (III) (the display control process) described above" is a process obtained by dividing the process related to the information processing method according to the present embodiment for the sake of convenience. Thus, for the process related to the information processing method according to the present embodiment, for example, "the switching process and at least one of the process (I) (the notification control process), the process (II) (the execution control process), and the process (III) (the display control process) described above" can be regarded as one process. In addition, for the process related to the information processing method according to the present embodiment, for example, "the switching process" and each of "the switching process and at least one of the process (I) (the notification control process), the process (II) (the execution control process), and the process (III) (the display control process) described above" can be regarded as two or more processes (depending on an arbitrary division method).

Figure 4:
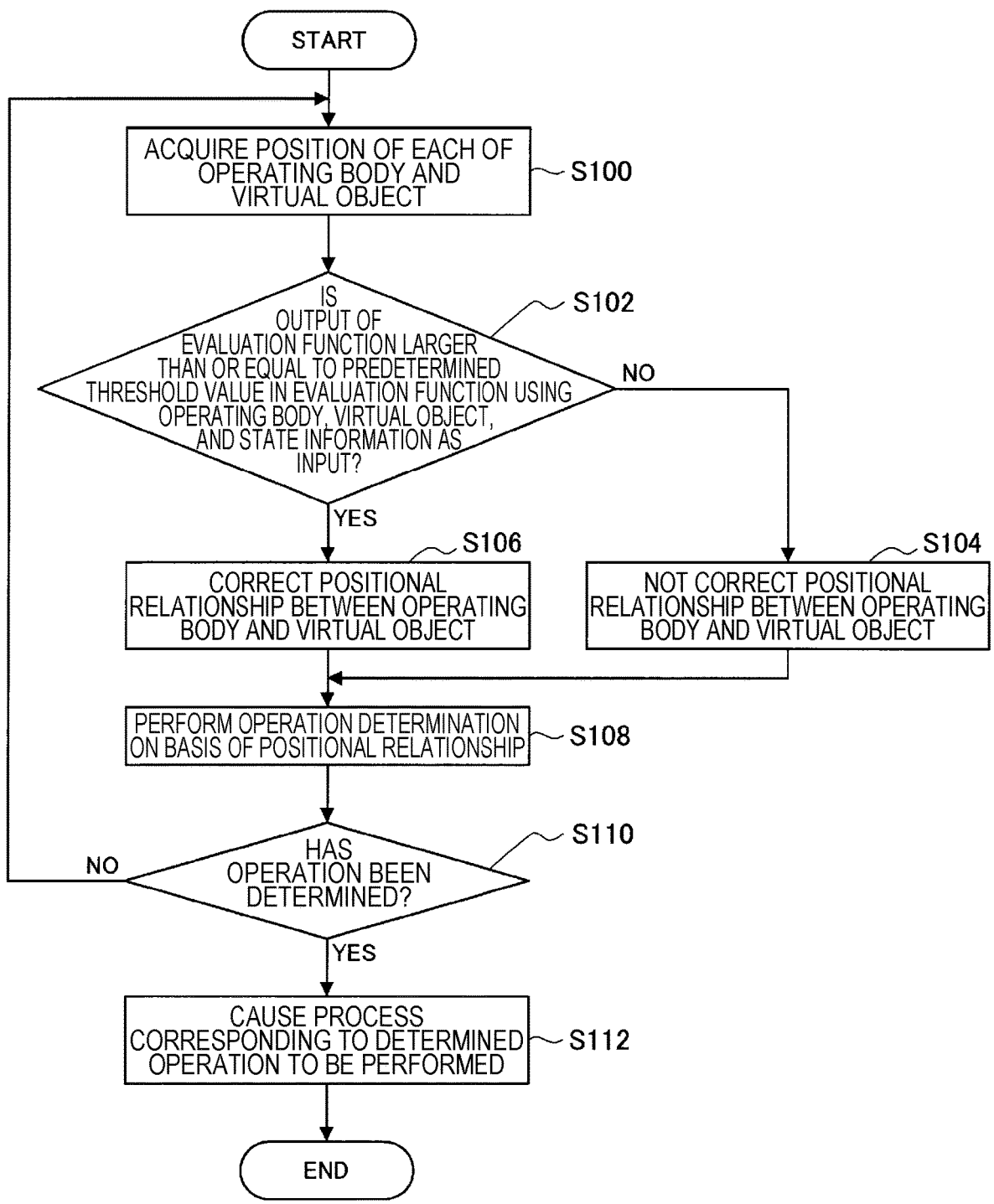
FIG. 4 is a flowchart illustrating an example of a process related to the information processing method according to the present embodiment.

[2] Specific Example of Process Related to Information Processing Method According to Present Embodiment FIG. 4 is a flowchart illustrating an example of the process related to the information processing method according to the present embodiment. FIG. 4 illustrates an example of a process in a case in which the switching process of the fourth examples described in (4) above and the process (II) (the execution control process) described above are performed as the process related to the information processing method according to the present embodiment. Here, the processes of Steps S102 to S108 of FIG. 4, for example, correspond to an example of the switching process of the fourth example described in (4) above. In addition, the process of Step S112 of FIG. 4, for example, corresponds to an example of the process (II) (the execution control process) described above.

The information processing device according to the present embodiment acquires a position of each of an operating body and a virtual object (S100).

The information processing device according to the present embodiment determines, for example, whether an evaluation value expressed by Expression 5 described above (an evaluation value obtained from an evaluation function based on operating body information, virtual object information, and user state information) is larger than or equal to a predetermined threshold value (S102).

In a case in which the evaluation value is determined not to be larger than or equal to the predetermined threshold value in Step S102, the information processing device according to the present embodiment performs operation determination on the basis of a positional relationship (S108) without correcting the positional relationship between the operating body and the virtual object (S108).

In Step S108, the information processing device according to the present embodiment detects a predetermined operation by the operating body with respect to the virtual object, for example, a touch operation, a flick operation, a pinch operation, a drag operation, or the like. The information processing device according to the present embodiment detects a predetermined operation by the operating body with respect to the virtual object using an arbitrary method in which an operation can be detected, for example, analysis of a captured image, or the like.

In addition, in the case in which the predetermined operation is detected, the information processing device according to the present embodiment determines that the operation by the operating body with respect to the virtual object has been performed.

Here, the processes of Step S104 and Step S108 performed in the case in which the evaluation value is determined not to be larger than or equal to the predetermined threshold value as a result of the determination of Step S102 correspond to the first determination process.

In addition, in a case in which the evaluation value is determined to be larger than or equal to the predetermined threshold value in Step S102, the information processing device according to the present embodiment corrects the positional relationship between the operating body and the virtual object (S106). Then, the information processing device according to the present embodiment performs operation determination on the basis of the corrected positional relationship between the operating body and the virtual object (S108).

Here, the processes of Step S106 and Step S108 performed in the case in which the evaluation value is determined to be larger than or equal to the predetermined threshold value as a result of the determination of Step S102 correspond to the second determination process.

The information processing device according to the present embodiment determines whether the operation by the operating body with respect to the virtual object has been determined in the process of Step S108 (S110).

In a case in which the it is not determined that the operation by the operating body with respect to the virtual object has been determined in Step S110, for example, the information processing device according to the present embodiment repeats the processes from Step S100.

In addition, in a case in which it is determined that the operation by the operating body with respect to the virtual object has been determined in Step S110, the information processing device according to the present embodiment causes a control object to perform a process corresponding to the determined operation (S112).

Here, in the case in which it is determined that the operation by the operating body with respect to the virtual object has been determined in Step S110, the information processing device according to the present embodiment does not perform the processes from Step S100, for example, until the determined operation ends. In addition, in a case in which it is determined that the determined operation has ended in Step S110, for example, the information processing device according to the present embodiment performs the processes from Step S100 again.

In a case in which a drag operation is determined as the operation by the operating body with respect to the virtual object, for example, it is determined that the determined operation has ended when a distance between the operating body such as a hand or a finger and the virtual object is longer than or equal to a set threshold value (or when the distance becomes longer than the threshold value). Note that a condition for determining that the determined operation has ended differs, for example, depending on each operation.

Since the information processing device according to the present embodiment does not perform the processes from Step S100 until the determined operation ends, a process with respect to another virtual object not intended by the user is prevented from being performed, for example, in the middle of the process corresponding to the determined operation.

The information processing device according to the present embodiment performs, for example, the process illustrated in FIG. 4 as the process related to the information processing method according to the present embodiment.

Note that the process related to the information processing method according to the present embodiment is not limited to the process illustrated in FIG. 4.

Although the example in which the positional relationship between the operating body and the virtual object is selectively corrected through the threshold processing using the evaluation value expressed by Expression 5 described above and one threshold value has been illustrated in, for example, FIG. 4, a method of correcting the positional relationship between the operating body and the virtual object is not limited to the example. The information processing device according to the present embodiment can also correct the positional relationship between the operating body and the virtual object in a stepwise manner on the basis of, for example, a result of multi-step threshold processing using a plurality of threshold values.

In addition, the information processing device according to the present embodiment may perform one of the switching process of the first example described in (1) above to the switching process of the third example described in (3) above or the switching process of the fifth example described in (5) above as the process related to the information processing method according to the present embodiment.

In addition, the process of Step S112 of FIG. 4 may be performed by, for example, an external device of the information processing device according to the present embodiment.

(Information Processing Device According to the Present Embodiment)

Next, an example of a configuration of the information processing device according to the present embodiment that can perform the process related to the above-described information processing method according to the present embodiment will be described.

Figure 5:
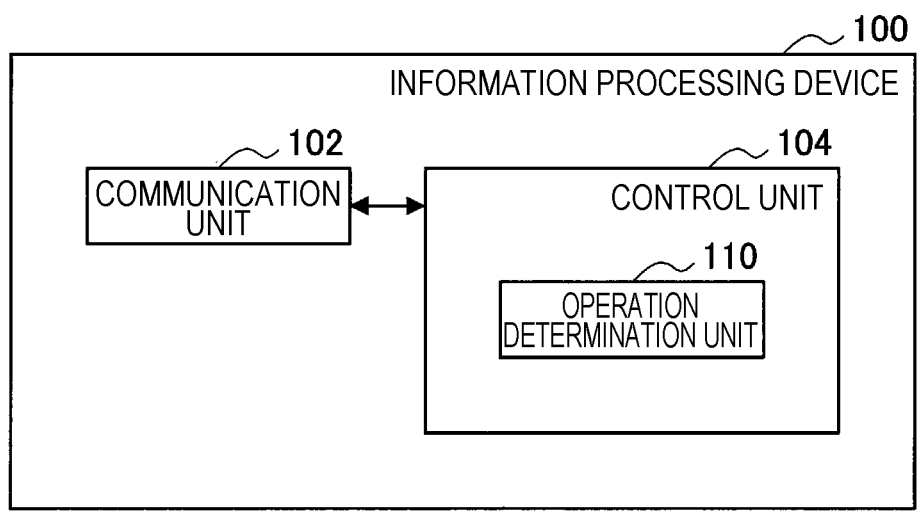
FIG. 5 is a block diagram illustrating an example of a configuration of an information processing device according to the present embodiment.

FIG. 5 is a block diagram illustrating an example of a configuration of an information processing device 100 according to the present embodiment. The information processing device 100 has, for example, a communication unit 102 and a control unit 104.

In addition, the information processing device 100 may have, for example, a read only memory (ROM, which is not illustrated), a random access memory (RAM, which is not illustrated), a storage unit (which is not illustrated), an operation unit that can be operated by a user (which is not illustrated), a display unit that displays various screens on a display screen (which is not illustrated), and the like. The information processing device 100 connects the constituent elements using, for example, a bus serving as a data transmission path.

The ROM (which is not illustrated) stores programs used by the control unit 104 or control data such as arithmetic parameters. The RAM (which is not illustrated) temporarily stores programs executed by the control unit 104, and the like.

The storage unit (which is not illustrated) is a storage means of the information processing device 100 and stores, for example, various kinds of data including data related to the information processing method according to the present embodiment, various applications and the like such as the threshold values related to the switching processes and the above-described various tables. Here, as the storage unit (which is not illustrated), for example, a magnetic recording medium such as a hard disk, a nonvolatile memory such as a flash memory, or the like is exemplified. In addition, the storage unit (which is not illustrated) may be detachable from the information processing device 100.

As the operation unit (which is not illustrated), an operation input device which will be described below is exemplified. In addition, as the display unit (which is not illustrated), a display device which will be described below is exemplified.

[Hardware Configuration Example of Information Processing Device 100]

Figure 6:
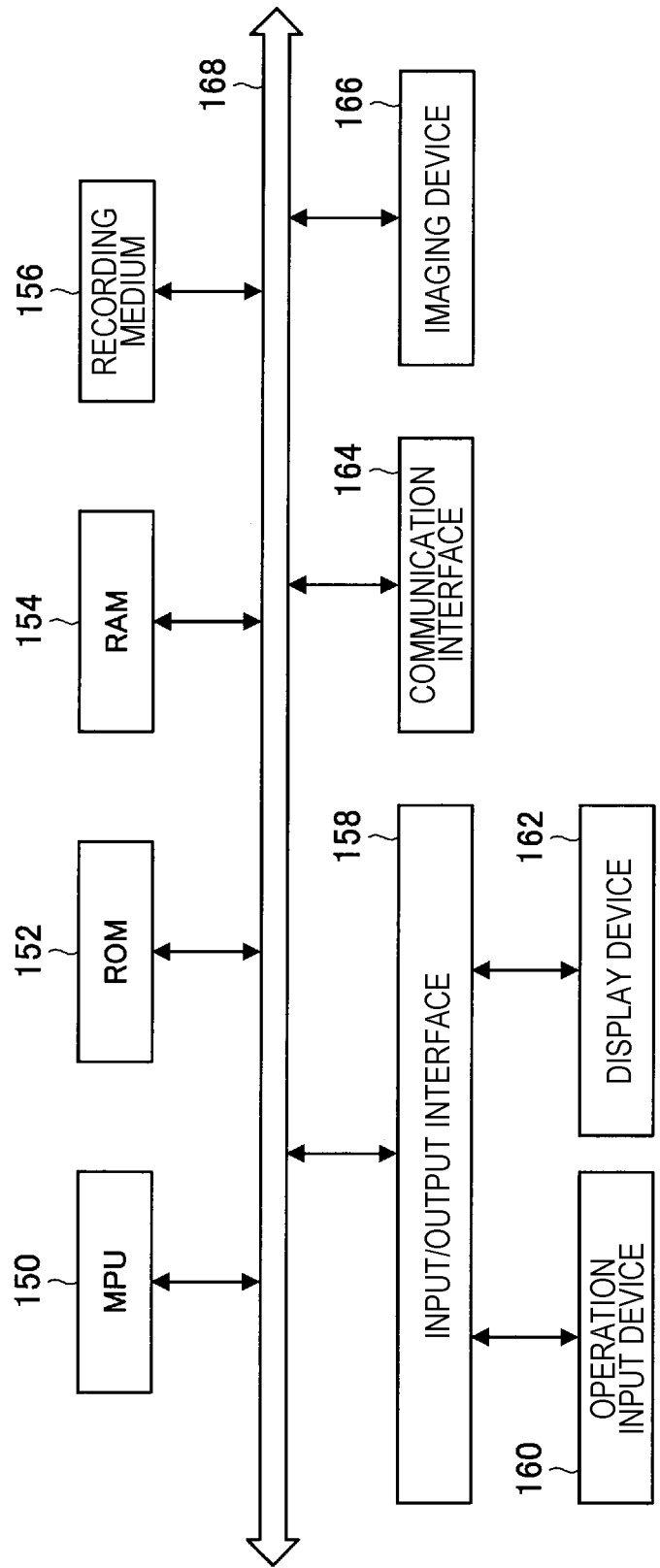
FIG. 6 is an explanatory diagram illustrating an example of a hardware configuration of the information processing device according to the present embodiment.

FIG. 6 is an explanatory diagram illustrating a hardware configuration example of the information processing device 100 according to the present embodiment. The information processing device 100 has, for example, an MPU 150, a ROM 152, a RAM 154, a recording medium 156, an input/output interface 158, an operation input device 160, a display device 162, and a communication interface 164. In addition, the information processing device 100 connects the constituent elements to each other with, for example, a bus 166 serving as data transmission path.

The MPU 150 is constituted by, for example, at least one processor configured as an arithmetic circuit such as an MPU, various processing circuits, and the like, and functions as the control unit 104 that controls the information processing device 100 overall. In addition, the MPU 150 plays a role of, for example, an operation determination unit 110 in the information processing device 100, which will be described below. Note that the operation determination unit 110 may be a dedicated (or a versatile) circuit (e.g., a separate processor from the MPU 150, etc.) that can realize processes of the operation determination unit 110 which will be described below.

The ROM 152 stores programs used by the MPU 150, control data such as arithmetic parameters, and the like. The RAM 154 temporarily stores, for example, programs executed by the MPU 150, and the like.

The recording medium 156 functions as a storage unit (which is not illustrated), and stores, for example, data related to the information processing method according to the present embodiment including the threshold values related to the switching processes, the above-described various tables, and the like and various kinds of data such as various applications. Here, as the recording medium 156, for example, a magnetic recording medium such as a hard disk or a nonvolatile memory such as a flash memory is exemplified. In addition, the recording medium 156 may be detachable from the information processing device 100.

The input/output interface 158 connects, for example, the operation input device 160 and the display device 162. The operation input device 160 functions as an operation unit (which is not illustrated), and the display device 162 functions as a display unit (which is not illustrated). Here, as the input/output interface 158, for example, a Universal Serial Bus (USB) terminal, a Digital Visual Interface (DVI) terminal, a High-Definition Multimedia Interface (HDMI) (registered trademark) terminal, any of various processing circuits, or the like is exemplified.

In addition, the operation input device 160 is provided, for example, on the information processing device 100, and is connected to the input/output interface 158 in the information processing device 100. As the operation input device 160, for example, buttons, arrow keys, a rotation-type selector such as a jog dial, a combination thereof, or the like is exemplified.

In addition, the display device 162 is provided, for example, on the information processing device 100, and is connected to the input/output interface 158 in the information processing device 100. As the display device 162, for example, a liquid crystal display, an organic electro-luminescence display (an organic EL display or which is also called an organic light emitting diode display (OLED display)), or the like is exemplified.

Note that it is a matter of course that the input/output interface 158 can also connected to an external device such as an external operation input device of the information processing device 100 (e.g., a keyboard, a mouse, or the like) or an external display device. In addition, the display device 162 may be a device on which display and user operations are possible, for example, a touch panel or the like.

The communication interface 164 is a communication means of the information processing device 100, and functions as the communication unit 102 for performing wireless or wired communication with an external device, for example, an HMD, a server, an imaging device, or the like that generates captured images through imaging via a network (or directly). Here, as the communication interface 164, for example, a communication antenna and a radio frequency (RF) circuit (wireless communication), an IEEE 802.15.1 port and a transmission/reception circuit (wireless communication), an IEEE 802.11 port and a transmission/reception circuit (wireless communication), a local area network (LAN) terminal and a transmission/reception circuit (wired communication), or the like is exemplified.

The information processing device 100 performs the process related to the information processing method according to the present embodiment with, for example, the configuration illustrated in FIG. 6. Note that a hardware configuration of the information processing device 100 according to the present embodiment is not limited to that illustrated in FIG. 6.

The information processing device 100 may not have the communication interface 164, for example, in a case in which the information processing device performs communication with an external device or the like via a connected external communication device or a case in which the information processing device performs standalone processes. In addition, the communication interface 164 may be capable of performing communication with at least one external device using a plurality of communication schemes.

In addition, the information processing device 100 may further have, for example, an imaging device that functions as an imaging unit (which is not illustrated) that generates images (moving images or still images) through capturing.

The imaging device includes, for example, a lens/image sensor, and a signal processing circuit. The lens/image sensor includes, for example, an image sensor that uses a plurality of lens of an optical system and image sensors such as complementary metal oxide semiconductors. The signal processing circuit has, for example, an automatic gain control (AGC) circuit and an analog-to-digital converter (ADC) and converts analog signals generated from the image sensors into digital signals (image data). In addition, the signal processing circuit performs, for example, various kinds of processing related to RAW development. Furthermore, the signal processing circuit may perform various kinds of signal processing, for example, white balance correction processing, color tone correction processing, gamma correction processing, YCbCr conversion processing, edge enhancement processing, and the like.

In addition, the information processing device 100 can also have a configuration not having, for example, the recording medium 156, the operation input device 160, and the display device 162.

In addition, the configuration illustrated in FIG. 6 (or a configuration of a modified example thereof) may be realized by, for example, at least one IC.

Referring to FIG. 5 again, the example of the configuration of the information processing device 100 will be described. The communication unit 102 is a communication means of the information processing device 100 and performs wireless or wired communication with an external device such as an HMD or a server via a network (or directly). In addition, communication of the communication unit 102 is controlled by, for example, the control unit 104.

Here, although a communication antenna and an RF circuit, a LAN terminal and a transmission/reception circuit, or the like, for example, are exemplified as the communication unit 102, a configuration of the communication unit 102 is not limited thereto. For example, the communication unit 102 can have a configuration corresponding to an arbitrary standard in which communication of a USB terminal, a transmission/reception circuit, and the like is possible or an arbitrary configuration in which communication with an external device is possible via a network. In addition, the communication unit 102 may be capable of performing communication with at least one external device using a plurality of communication schemes.

The control unit 104 is constituted by, for example, an MPU or the like and plays a role of controlling the information processing device 100 overall. In addition, the control unit 104 has, for example, the operation determination unit 110 and plays a leading role of performing the process related to the information processing method according to the present embodiment.

The operation determination unit 110 plays a leading role of performing the process related to the information processing method according to the present embodiment.

For example, the operation determination unit 110 performs the switching process to switch the determination processes of determining an operation with respect to a virtual object. The operation determination unit 110 performs, for example, any process of the switching process of the first example described in (1) above to the switching process of the fifth example described in (5) above, and switches between the first determination process of determining an operation with respect to the virtual object without correcting a positional relationship between an operating body and the virtual object and the second determination process of determining an operation with respect to the virtual object with correction of the positional relationship between the operating body and the virtual object.

In addition, the operation determination unit 110 can further perform, for example, one or both of the process (I) (the notification control process) and the process (II) (the execution control process) described above.

Having the operation determination unit 110, for example, the control unit 104 takes the initiative of performing the process related to the information processing method according to the present embodiment (e.g., "the switching process," "the switching process and the process (I) (the notification control process) described above," "the switching process and the process (II) (the execution control process)," or "the switching process, the process (I) (the notification control process), and the process (II) (the execution control process) described above").

Note that a configuration of the control unit according to the present embodiment is not limited to the example described above. The control unit according to the present embodiment may further include, for example, a display control unit (which is not illustrated) that takes the initiative of performing the process (III) (the display control process) described above.

The information processing device 100 performs the process related to the information processing method according to the present embodiment (e.g., "the switching process," or "the switching process and at least one of the process (I) (the notification control process), the process (II) (the execution control process), and the process (III) (the display control process) described above") with, for example, the configuration illustrated in FIG. 5 (a configuration of a control unit according to the modified example).

Therefore, the information processing device 100 can achieve improvement in user operability with, for example, the configuration illustrated in FIG. 5.

In addition, with the configuration illustrated in FIG. 5, for example, the information processing device 100 can exhibit effects brought by performing the above-described process related to the information processing method according to the present embodiment.

Note that a configuration of the information processing device according to the present embodiment is not limited to the configuration illustrated in FIG. 5.

For example, the information processing device according to the present embodiment can have the operation determination unit 110 illustrated in FIG. 5 (or one or both of an operation determination unit 110 according to the modified example and a display control unit (which is not illustrated)) separately from the control unit 104 (e.g., the operation determination unit can be realized as a separate processing circuit).

In addition, each of "the switching process" and "the switching process and at least one of the process (I) (the notification control process), the process (II) (the execution control process), and the process (III) (the display control process) described above" is a process obtained by dividing the process related to the information processing method according to the present embodiment for the sake of convenience as described above. Thus, a configuration for realizing the process related to the information processing method according to the present embodiment is not limited to the operation determination unit 110 illustrated in FIG. 5 (or one or both of the operation determination unit 110 according to the modified example and the display control unit (which is not illustrated)), and a configuration corresponding to a division method of the process related to the information processing method according to the present embodiment can be adopted.

In addition, the information processing device according to the present embodiment may not have the communication unit 102, for example, in a case in which the information processing device performs communication with an external device via an external communication device having a similar function and configuration to those of the communication unit 102 or performs standalone processes.

Although the present embodiment has been described exemplifying the information processing device above, the present embodiment is not limited thereto. The present embodiment can be applied to various apparatuses that can perform the process related to the information processing method according to the present embodiment, for example, computers such as personal computers (PCs) and servers, devices worn in head of users for use such as HMDs and eyewear, projection devices that can project virtual images in real spaces, tablet-type devices, communication devices such as mobile telephones and smartphones, and the like. In addition, the present embodiment can also be applied to, for example, processing ICs that can be incorporated into the above-described apparatuses.

In addition, the information processing device according to the present embodiment may be applied to a system including a plurality of devices on the premise of connection to a network (or communication between respective devices), for example, cloud computing or the like. That is, the above-described information processing device according to the present embodiment can also realize, for example, an information processing system that performs the process related to the information processing method according to the present embodiment with a plurality of devices. As the information processing system that performs the process related to the information processing method according to the present embodiment with a plurality of devices, for example, a system in which a plurality of devices constituting the information processing system perform "the switching process" or "the switching process and at least one of the process (I) (the notification control process), the process (II) (the execution control process), and the process (III) (the display control process) described above" in cooperation is exemplified.

(Program According to the Present Embodiment)

Improvement in user operability can be achieved by executing a program for causing a computer system to function as the information processing device according to the present embodiment (e.g., a program that enables the process related to the information processing method according to the present embodiment to be executed, such as "the switching process" or "the switching process and at least one of the process (I) (the notification control process), the process (II) (the execution control process), and the process (III) (the display control process) described above") with a processor or the like of the computer system. Here, as the computer system according to the present embodiment, a single computer or a plurality of computers are exemplified. A series of processes related to the information processing method according to the present embodiment are performed by the computer system according to the present embodiment.

In addition, the effects brought by performing the above-described process related to the information processing method according to the present embodiment can be exhibited by executing a program for causing the computer system to function as the information processing device according to the present embodiment with a processor or the like of the computer system.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although it has been described above that the program (or a computer program) for causing the computer system to function as the information processing device according to the present embodiment is provided, for example, a recording medium (a recording medium readable by the computer system or the like) for storing the program can be further provided in the present embodiment together.

The above-described configuration is an example of the present embodiment and of course belongs to the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
An information processing device including:
an operation determination unit configured to execute a determination process of determining an operation input of a user with an operating body with respect to a virtual object defined in a virtual three-dimensional space,
in which the operation determination unit executes the determination process on a basis of spatial position information of the operating body in a real three-dimensional space and switches the determination process on a basis of information of the operating body.

(2)
The information processing device according to (1), in which the virtual object is displayed to be visually recognizable together with an image of the operating body in the real three-dimensional space.

(3)
The information processing device according to (2), in which the information of the operating body is one or both of information representing a motion of the operating body and information based on a position of the operating body.

(4)
The information processing device according to (3), in which the information representing the motion of the operating body is information of a movement speed of the operating body.

(5)
The information processing device according to (4), in which the operation determination unit switches the determination process such that a criterion for determining that there is an operation with respect to the virtual object is more relaxed when the movement speed of the operating body is a second speed that is higher than a first speed than when the movement speed of the operating body is the first speed.

(6)
The information processing device according to (5), in which the criterion is a criterion related to a virtual positional relationship between the operating body and the virtual object.

(7)
The information processing device according to any one of (1) to (6), in which the operation determination unit makes the determination process more difficult to switch when a plurality of the virtual objects have a second density that is higher than a first density than when the plurality of virtual objects have the first density.

(8)
The information processing device according to any one of (1) to (7), in which the operation determination unit switches the determination process on a basis of information of the virtual object and user state information.

(9)
The information processing device according to any one of (1) to (8), in which the operation determination unit switches the determination process on a basis of the information of the operating body and information of the virtual object.

(10)
The information processing device according to (8) or (9), in which information of the virtual object is one or two or more of information representing a position of the virtual object, information representing a state of the virtual object, and information representing a type of the virtual object.

(11)
The information processing device according to any one of (1) to (10), in which the operation determination unit executes the determination process on a basis of an operation determination area defined in association with the virtual object.

(12)

The information processing device according to (11), in which the operation determination area is not visually recognized by the user.

(13)

The information processing device according to (10), in which the operation determination area is displayed to be visually recognizable by the user.

(14)

The information processing device according to any one of (1) to (13), in which the operation determination unit controls execution of a process corresponding to a determined operation with respect to the virtual object, and the information processing device includes a display control unit configured to change display of the virtual object on a basis of determination by the operation determination unit that there is the operation.

(15)

The information processing device according to (14), in which the virtual object is a virtual input device.

(16)

The information processing device according to any one of (1) to (15), in which the operation determination unit switches between a first determination process of determining an operation with respect to the virtual object without correction of a positional relationship between the operating body and the virtual object and a second determination process of determining an operation with respect to the virtual object with correction of the positional relationship between the operating body and the virtual object.

(17)

The information processing device according to any one of (1) to (15), in which the operation determination unit switches between a first determination process and a second determination process, correction of a criterion of the first determination process of determining that there is an operation with respect to the virtual object is performed in a first direction and a second direction that is different from the first direction in the second determination process, and a degree of correction in the first direction is different from a degree of correction in the second direction in the second determination process.

(18)

The information processing device according to any one of (1) to (17), in which the operation determination unit switches the determination process with respect to a depth direction on the basis of the information of the operating body.

(19)

An information processing method executed by an information processing device, the information processing method including:

a step of executing a determination process of determining an operation input of a user with an operating body with respect to a virtual object defined in a virtual three-dimensional space, in which, in the execution step, the determination process is executed on a basis of spatial position information of the operating body in a real three-dimensional space and the determination process is switched on a basis of information of the operating body.

(20)

A program causing a computer system to realize:

a function of executing a determination process of determining an operation input of a user with an operating body with respect to a virtual object defined in a virtual three-dimensional space, in which, with the execution function, the determination process is executed on a basis of spatial position information of the operating body in a real three-dimensional space and the determination process is switched on a basis of information of the operating body.

REFERENCE SIGNS LIST

100 information processing device
102 communication unit
104 control unit
110 operation determination unit

The invention claimed is:

1. An information processing device, comprising:
at least one processor configured to:
    determine user state information based on information from a plurality of sensors, wherein the user state information corresponds to one of a walking state, a stationary state, or a running state;
    switch between execution of:
        a first determination process to determine a user input operation, on a virtual object, without correction of a positional relationship between an operating body and the virtual object, wherein
            the user input operation is by the operating body,
            the operating body is in a real three-dimensional space, and
            the virtual object is in a virtual three-dimensional space, and
        a second determination process to determine the user input operation, on the virtual object, with the correction of the positional relationship between the operating body and the virtual object, wherein
            the switch between the execution of the first determination process and the second determination process is based on spatial position information of the operating body and the determined user state information; and
    control execution of a specific process based on the determination of the user input operation.

2. The information processing device according to claim 1, wherein the at least one processor is further configured to control a display screen to display the virtual object and an image of the operating body, such that the virtual object is visually recognizable.

3. The information processing device according to claim 2, wherein the at least one processor is further configured to switch between the execution of the first determination process and the second determination process based on motion information of the operating body.

4. The information processing device according to claim 3, wherein the motion information indicates a movement speed of the operating body.

5. The information processing device according to claim 4, wherein the at least one processor is further configured to switch between the execution of the first determination process and the second determination process based on a criterion, the criterion is based on a first speed value of the movement speed of the operating body and a second speed value of the movement speed of the operating body, and the first speed value is different from the second speed value.

6. The information processing device according to claim 5, wherein the criterion is related to a virtual positional relationship between the operating body and the virtual object.

7. The information processing device according to claim 1, wherein
the at least one processor is further configured to switch between the execution of the first determination process and the second determination process based on a first density value of a plurality of virtual objects and a second density value of the plurality of virtual objects, and
the first density value is different from the second density value.

8. The information processing device according to claim 1, wherein the at least one processor is further configured to switch between the execution of the first determination process and the second determination process based on specific information of the virtual object.

9. The information processing device according to claim 8, wherein the specific information of the virtual object is at least one of information representing a position of the virtual object, information representing a state of the virtual object, and information representing a type of the virtual object.

10. The information processing device according to claim 1, wherein the execution of the first determination process and the second determination process is based on an operation determination area associated with the virtual object.

11. The information processing device according to claim 10, wherein the operation determination area is visually unrecognizable.

12. The information processing device according to claim 10, wherein the at least one processor is further configured to control a display screen to display the operation determination area such that the operation determination area is visually recognizable.

13. The information processing device according to claim 1, wherein
the at least one processor is further configured to control a display screen, to change a display of the virtual object, based on the determination of the user input operation.

14. The information processing device according to claim 13, wherein the virtual object is a virtual input device.

15. The information processing device according to claim 1, wherein
the at least one processor is further configured to correct a criterion of the execution of the first determination process and the second determination process, based on a first direction of the user input operation and a second direction of the user input operation,
the second direction is different from the first direction, and
in the second determination process, a degree of correction of the positional relationship in the first direction is different from a degree of correction of the positional relationship in the second direction.

16. The information processing device according to claim 1, wherein the at least one processor is further configured to switch between the execution of the first determination process and the second determination process with respect to a depth direction of the operating body.

17. An information processing method, comprising:
determining user state information based on information from a plurality of sensors, wherein the user state information corresponds to one of a walking state, a stationary state, or a running state;
switching between execution of:
a first determination process of determining a user input operation, on a virtual object, without correction of a positional relationship between an operating body and the virtual object, wherein
the user input operation is by the operating body,
the operating body is in a real three-dimensional space, and
the virtual object is in a virtual three-dimensional space, and
a second determination process of determining the user input operation, on the virtual object, with the correction of the positional relationship between the operating body and the virtual object, wherein
the switching between the execution of the first determination process and the second determination process is based on spatial position information of the operating body and the determined user state information; and
controlling execution of a specific process based on the determination of the user input operation.

18. A non-transitory computer-readable medium having stored thereon, computer-executable instructions which when executed by a computer, cause the computer to execute operations, the operations comprising:
determining user state information based on information from a plurality of sensors, wherein the user state information corresponds to one of a walking state, a stationary state, or a running state;
switching between execution of:
a first determination process of determining a user input operation, on a virtual object, without correction of a positional relationship between an operating body and the virtual object, wherein
the user input operation is by the operating body,
the operating body is in a real three-dimensional space, and
the virtual object is in a virtual three-dimensional space, and
a second determination process of determining the user input operation, on the virtual object, with the correction of the positional relationship between the operating body and the virtual object, wherein
the switching between the execution of the first determination process and the second determination process is based on spatial position information of the operating body and the determined user state information; and
controlling execution of a specific process based on the determination of the user input operation.

* * * * *